Patented July 15, 1941

2,249,341

UNITED STATES PATENT OFFICE 2,249,341

SEPARATION OF GERMANIUM

Clarence Zischkau, Woodbridge, N. J., assignor to American Smelting and Refining Company, New York, N. Y., a corporation of New Jersey No Drawing. Application June 12, 1940, Serial No. 340,089

5 Claims. (Cl. 75—121)

This invention relates to the extraction or separation of germanium from germanium-bearing solutions.

The invention is of wide applicability and provides a simple, efficient process by which germanium is readily removed from solutions containing same regardless of whether the primary objective be to recover the germanium as a value or simply to purify a solution contaminated by it. Thus, the invention may be employed advantageously for such divergent purposes as, e. g., concentrating the germanium preparatory to producing the metal itself, and purifying leach solutions and electrolytes encountered in electrolytic zinc operations which are adversely affected by the presence of germanium.

Briefly, the invention is based upon the discovery that tannic acid will precipitate germanium from germanium-bearing solutions and that the reaction can be driven substantially to completion, thereby precipitating the germanium practically in toto, by adding the tannic acid in sufficient excess.

Proceeding in accordance with the invention, tannic acid is stirred into the germanium-bearing solution and the precipitation allowed to proceed either at room, or at an elevated, temperature. The amount of tannic acid added will be governed ordinarily by the economic balance it is desired to strike between the quantity of tannic acid used and the quantity of germanium left in the solution. The precipitate is aptly separated from the germanium-depleted solution by filtration and in this connection a filter press of large frame volume is recommended by reason of the bulky nature of the precipitate. It has been observed in practise that the germanium precipitate may occur in two distinct forms, that is, one exhibiting very large grains and the other of a light, somewhat flocculent nature.

The following specific example, involving the treatment of a total of 134.92 kilos of germanium-bearing crude oxide concentrates produced from so-called lead sulphate residues resulting from the treatment of cadmium-bearing fume, will serve to illustrate the invention. It will be understood that such crude concentrates are of a complex composition containing, besides germanium, such constituents as arsenic, cadmium, indium, iron, lead, silica, zinc, etc. In the particular concentrates used in this example, arsenic and indium predominated.

Initially, 45.36 kilos of said concentrate, containing 0.24 kilo germanium, were added to 170 liters of leach solution containing 43.52 kilos $H_2SO_4$ and 0.014 kilo Ge and mixed for three hours accompanied by saturation with sulphur dioxide. This mixture was then filtered and the filtrate (1) preserved.

The residue from the foregoing filtration was treated with 45.36 kilos concentrated (95%) $H_2SO_4$ and 86.18 kilos $H_2O$, mixed for two hours accompanied by saturation with sulphur dioxide, and filtered. The resulting filtrate was used to treat 45.36 kilos more of concentrate containing 0.463 kilo germanium by mixing for three hours adding sulphur dioxide as before. This mixture was then filtered, the filtrate (2) identified, and the residue mixed with 45.36 kilos concentrated (95%) $H_2SO_4$ and 86.18 kilos $H_2O$ for two hours with sulphur dioxide added to saturation, and filtered.

To the filtrate obtained by the filtration step last mentioned, there were added 44.2 kilos concentrates containing 0.892 kilo germanium and mixing was continued for three hours while saturating with sulphur dioxide. The resulting mixture was then filtered, the filtrate (3) identified, and the residue leached with 9.07 kilos concentrated (95%) $H_2SO_4$ and 86.18 kilos $H_2O$ for two hours, while being saturated with sulphur dioxide, and then filtered to yield filtrate (4).

The filtrates (1), (2), (3) and (4) were combined with 70 liters of solution containing 0.049 kilo Ge to yield a germanium solution containing a total of 1.44 kilos germanium.

Tannic acid to the extent of 13.61 kilos and in the form of an aqueous saturated solution was next added to the germanium solution and thoroughly mixed therewith. The mixture was then filtered and the filtrate treated with 9.07 kilos tannic acid added, as before, in the form of an aqueous saturated solution. Upon filtering, the filtrate contained only 0.066 kilo of germanium.

The two filter cakes from the foregoing tannic acid treatments were combined, treated with 2.27 kilos tannic acid dissolved in 300 liters of water, and filtered yielding a filtrate in which the germanium content was only 0.026 kilo. This represented, by difference, a total of 1.348 kilos germanium precipitated by the tannic acid treatment, or, an extraction of nearly 94%.

While the process of the invention has been described with reference to the precipitation of garmanium from a particular complex solution, it will be understood that such specific disclosure is to be regarded as illustrative, rather than as limitative, of the invention set forth in the following claims.

What is claimed is:

1. The process for treating germanium-bearing material which comprises leaching the material to yield a germanium-bearing solution, incorporating tannic acid in said solution, and filtering the resulting mixture.

2. In the art of concentrating germanium, the step consisting in mixing tannic acid and a germanium-bearing solution to precipitate the germanium.

3. The process for treating a solution containing germanium which comprises adding tannic acid to the solution, and effecting a separation between the precipitate and the solution.

4. In a process for purifying metallurgical solutions contaminated by germanium, the step which consists in treating the contaminated solution with tannic acid in excess thereby precipitating the germanium.

5. The process for treating germanium-bearing metallurgical products of oxidic nature which comprises leaching said products with sulphuric acid to dissolve soluble values, the leach also dissolving an appreciable amount of the germanium, reducing the germanium content of the leach solution to an innocuous amount by precipitation with tannic acid, and effecting a separation between the precipitated germanium and the remaining solution.

CLARENCE ZISCHKAU.